United States Patent [19]

Carrouset

[11] 4,146,353

[45] Mar. 27, 1979

[54] PUMP IMPELLER

[76] Inventor: Pierre Carrouset, 11, rue Humblot, 75015 Paris, France

[21] Appl. No.: 816,913

[22] Filed: Jul. 19, 1977

[30] Foreign Application Priority Data

Jul. 23, 1976 [FR] France ............................ 76 22550

[51] Int. Cl.² .............................................. F01D 5/22
[52] U.S. Cl. ................................. 416/176; 416/179
[58] Field of Search ...................... 416/176, 179, 177

[56]  References Cited

U.S. PATENT DOCUMENTS

| 216,136 | 6/1879 | Binzer et al. ................... 416/229 X |
| 300,702 | 6/1884 | Fisher ............................ 415/213 C X |
| 653,979 | 7/1900 | Altman .............................. 416/176 |
| 799,800 | 9/1905 | Newell ............................... 416/235 |
| 1,543,261 | 6/1925 | Hickman ........................ 416/176 X |
| 3,261,294 | 7/1966 | Schofield et al. .............. 416/176 X |
| 3,906,888 | 9/1975 | Justinien ........................ 416/176 X |

FOREIGN PATENT DOCUMENTS 1020606 12/1957 Fed. Rep. of Germany ........... 416/193
773198 11/1934 France ...................................... 416/176

*Primary Examiner*—Everette A. Powell, Jr.
*Attorney, Agent, or Firm*—Dennison, Dennison, Meserole & Pollack

[57]  ABSTRACT

The present invention relates to a pump impeller for moving a fluid, comprising a hub on which at least one blade is fixed, wherein a support connects each blade to the hub and extends radially, winding helically with respect to the axis of said hub, while each blade extends in a direction substantially perpendicular to the radial direction of each support. One application of the present invention is the production of a pump impeller with high speed of rotation and high yield.

3 Claims, 11 Drawing Figures

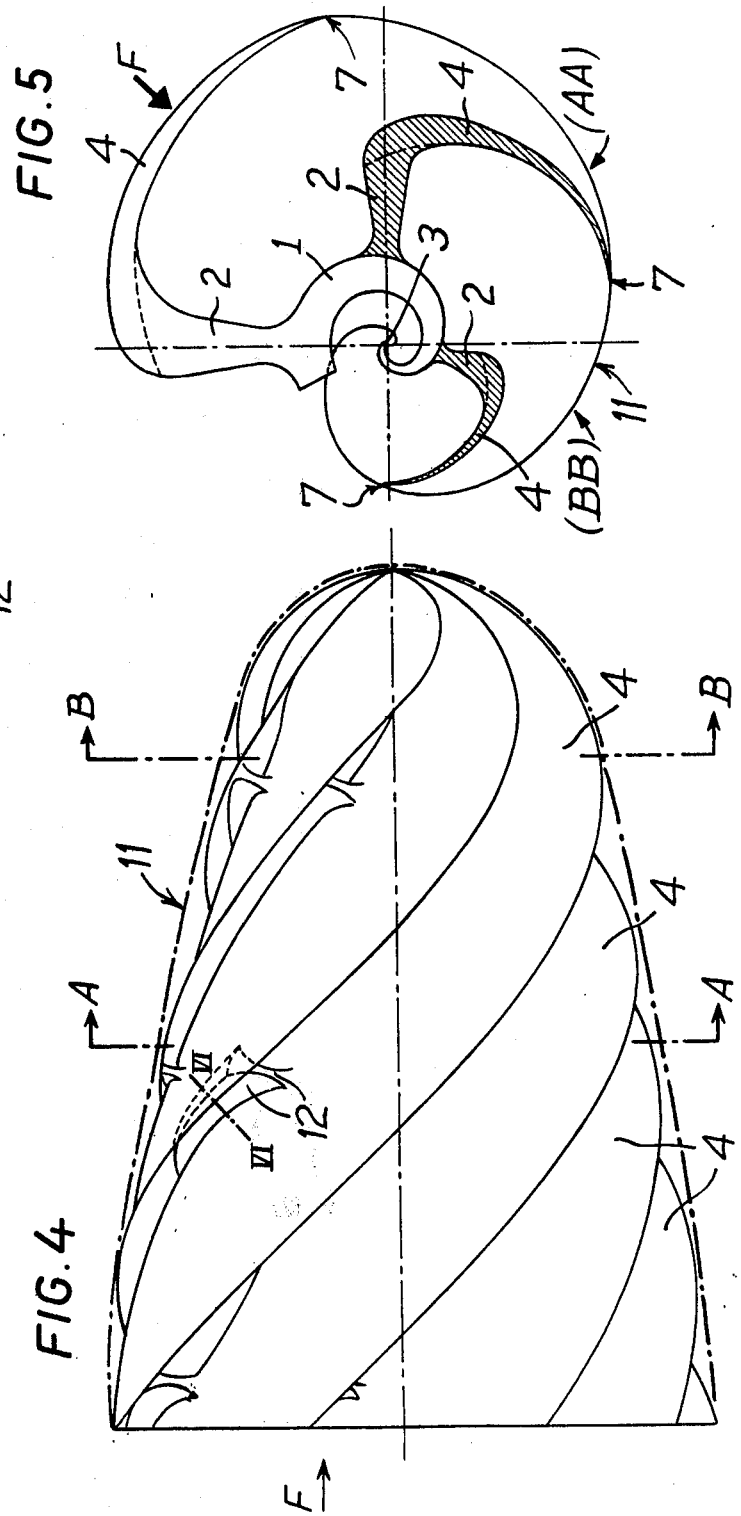

PUMP IMPELLER

The present invention relates to a pump impeller for moving a fluid.

The problem of pressurisation of a fluid by means of a pump impeller rotating at high speed has, up to the present day, been inadequately solved by existing equipment. This equipment is in fact unsuited to the purpose since it has sections which are not well adapted to the high speed flow of the fluids, and consequently gives low yields.

The invention intends to remedy this state of affairs by proposing a novel pump impeller for moving a fluid, comprising a hub on which at least one blade is fixed.

At least one support connects each blade to said hub and extends radially, winding helically with respect to the axis of said hub, whilst each blade extends in a direction substantially perpendicular to the radial direction of each support.

According to a first embodiment of the invention, each blade comprises two edges, each being substantially contained in a radial plane.

This pump impeller also advantageously comprises at least two successive supports, whilst the same blade covers the two supports and presents a thinner portion above the channel formed between these supports.

According to a second embodiment, each blade winds helically around the axis of the hub.

The following arrangements are preferably adopted:

the helical pitch of each blade is equal to the helical pitch of the support with which said blade is fast;

the pump impeller comprises at least two successive supports, on each of which is fixed one blade, and between which is formed a channel, whilst the part of at least one of the blades, opposite the leading edge of this blade, is constituted of a tail member, which is connected to the support of said blade and completes the delimitation of the channel, by closing said latter at least partially.

Finally, it is often advantageous:

if the pump impeller comprises at least two blades, one of them partially overlapping the other, whilst a tongue is disposed between the two blades in the overlapping zone and connects these two blades, or, having a blade overlapping itself, a tongue connects the portions of said blade which overlap each other.

if the leading edges of the various blades are disposed on a surface of revolution, the axis of which merges with the axis of the hub, and which is ogival in form.

if an anti-whirl device is disposed near the surface produced by the leading edges of the blades.

The invention will be more readily understood on reading the following description with reference to the accompanying drawings, in which:

FIG. 1 is a schematic view, in elevation, of a pump impeller according to the invention, FIG. 2 is a section along II—II of FIG. 1, passing through the support of a blade, FIG. 3 is a section along III—III of FIG. 1, above a channel delimited by two blade supports, FIG. 4 is a view in elevation of a variant of a pump impeller according to the invention, FIG. 5 is a multiple view of the same blade, its support and the hub of the pump impeller of FIG. 4, in the direction of arrow F, sections A—A and B—B, respectively, FIG. 6 is a section along VI—VI of FIG. 4, showing the connection of the blades by a tongue.

Figure 1:
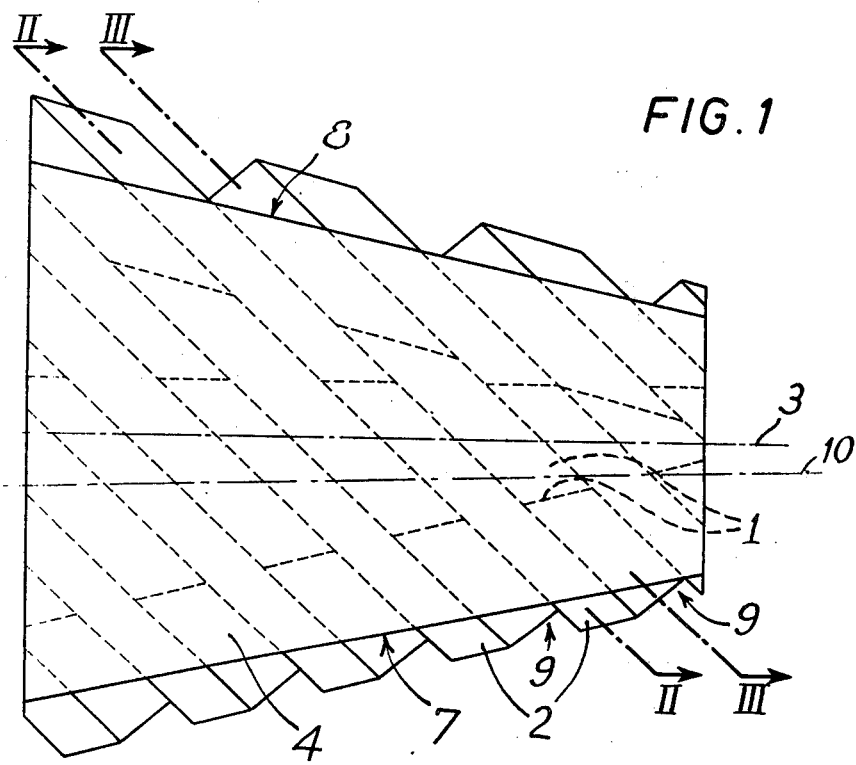
Figure 2:
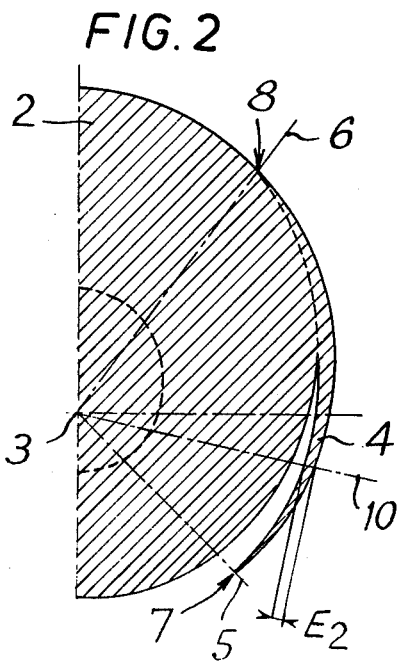
Figure 3:
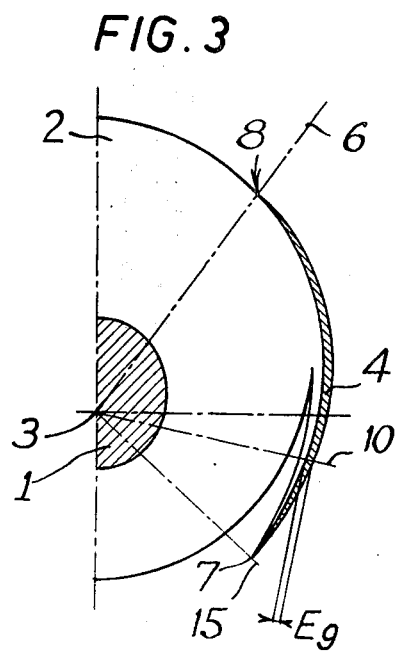

Referring now to the drawings, FIGS. 1, 2 and 3 show a pump impeller which comprises a central hub 1, supports 2 which are helically wound around the axis 3 of the hub 1, and a plurality of blades 4, identical to the single blade which has been shown, which are each delimited by two angularly spaced planes 5 and 6, passing through the axis 3 and containing edges 7 and 8 of this blade. The leading edge 7 may of course take any section compatible with a good flow of the fluid.

It should be noted that the outer axial faces of the supports 2 are substantially disposed on a truncated cone, so that the edges 7 forming leading edge of the blades 4, are also substantially disposed on a truncated cone, said supports extending radially with respect to the axis 3. The blades 4 are on the contrary perpendicular to the radial directions passing through axis 3.

Furthermore, a channel 9 being constituted by and between two adjacent supports, the thickness $E_9$ of the blade 4, above this channel, is smaller than the thickness $E_2$ of the same blade above a support 2, the thickness being measured in the same axial plane 10, as the blade 4 is effectively thinned above each channel 9.

Furthermore, the pump impeller is obtained by moulding, in the foundry, so that the supports 2, the hub 1 and blades 4 are in one single piece. Of course, a variant embodiment wherein initially separate parts would be assembled together, would also be in accordance with the invention.

The blade 4 shown in "straight", since it is delimited by straight edges 7 and 8 which therefore do not wind helically.

An important variant embodiment is shown in FIGS. 4, 5 and 6, in which is noted, on the one hand, the outside ogival form 11 of the surface on which the leading edges 7 of the various blades 4 are disposed, and, on the other hand, the fact that each blade 4 is itself wound in a spiral around the axis 3. In the example shown, the pitches of the helices of the supports 2 and the blades 4 are equal so that a blade 4 "follows" its support 2 by winding neither more quickly nor less quickly than said support. This arrangement is shown in particular in FIG. 5 in which three sections of the same blade 4 and its support 2 have been shown, angularly shifted since the helices of the support and of the blade have themselves turned.

Of course, there again, it remains possible, within the framework of the invention, to design and produce helical blades having different (upper or lower) pitches from those of their supports, as well as to adopt variable pitches both for the supports 2 and for the blades 4.

In FIGS. 4 and 6, it is noted that a blade 4 is connected to another blade 4 which it partly overlaps, by tongues 12.

Figure 7:
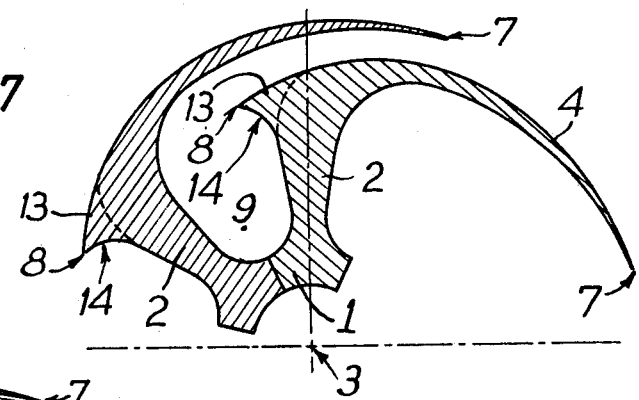
FIGS. 7 and 8 are transverse sections through a pump impeller according to the invention, showing the same two blades, one partially overlapping the other, without and with connecting tongues.
Figure 8:
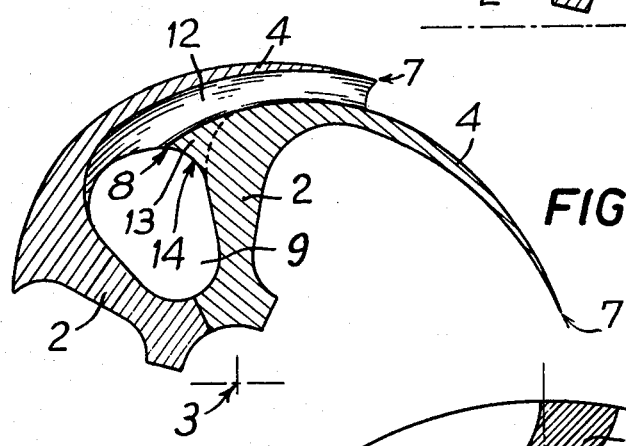

FIGS. 7 and 8 show a variant pump impeller according to the invention. The elements which have already been described are found again, but it is noted that the rear part of each blade further constitutes therefor a projection, forming tail 13, which is connected to the support 2 in a fillet 14 and which has for its effect, by cooperating with the blade 4 overlapping it, and the two supports 2 of the two blades, partly to close the channel 9.

Where a tongue 12 is located, this channel 9 is then entirelyclosed and has rounded forms adapted to produce a good flow of the fluid.

Figure 9:
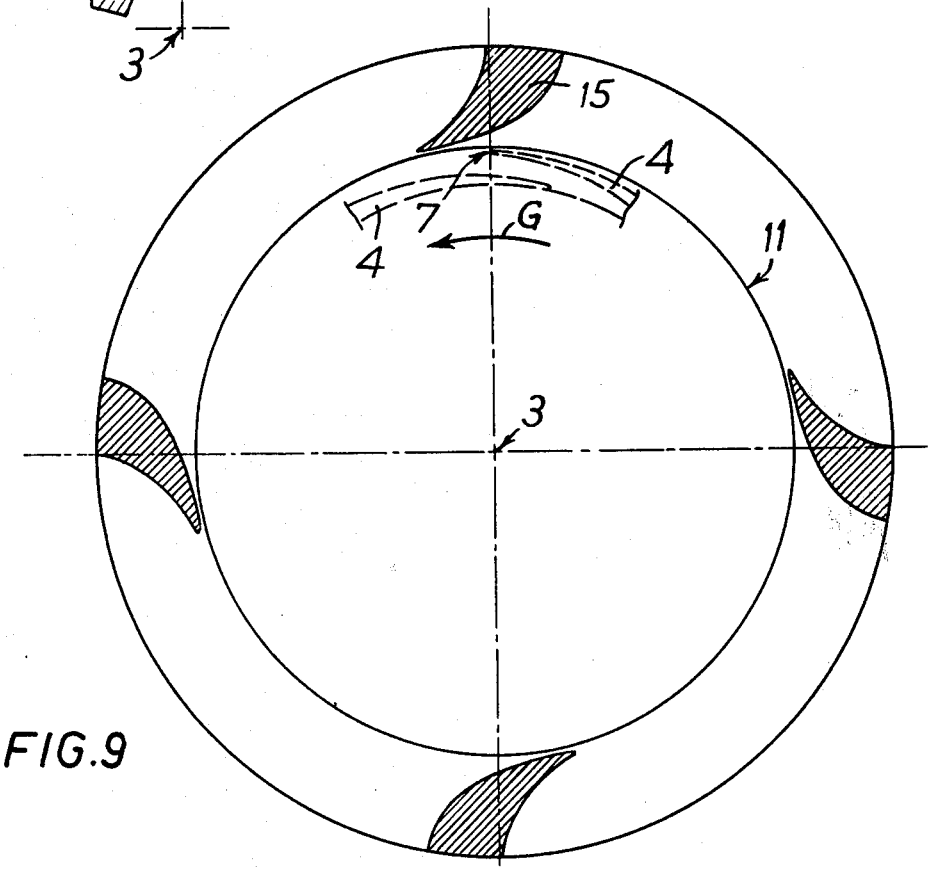
FIG. 9 shows, in section, an anti-whirl device with which a pump impeller according to the invention is fitted.

FIG. 9 shows the corners of an anti-whirl device 15 which is fixed to the support of the pump impeller, and with respect to which the blades 4 are driven in rotation in the direction of arrow G. The corners are disposed near the surface 11 crossed by the leading edges 7 during their rotation.

Figure 10:
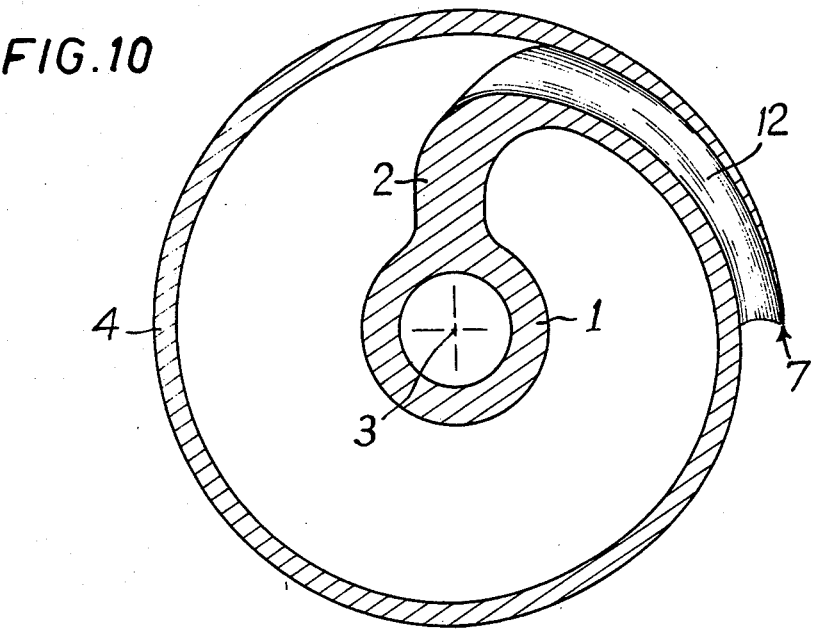
FIG. 10 is a transverse section through a variant blade according to the invention.

FIG. 10 shows a variant pump impeller with one blade, which overlaps itself, and of which the overlapping portions are also connected by a tongue 12.

Figure 11:
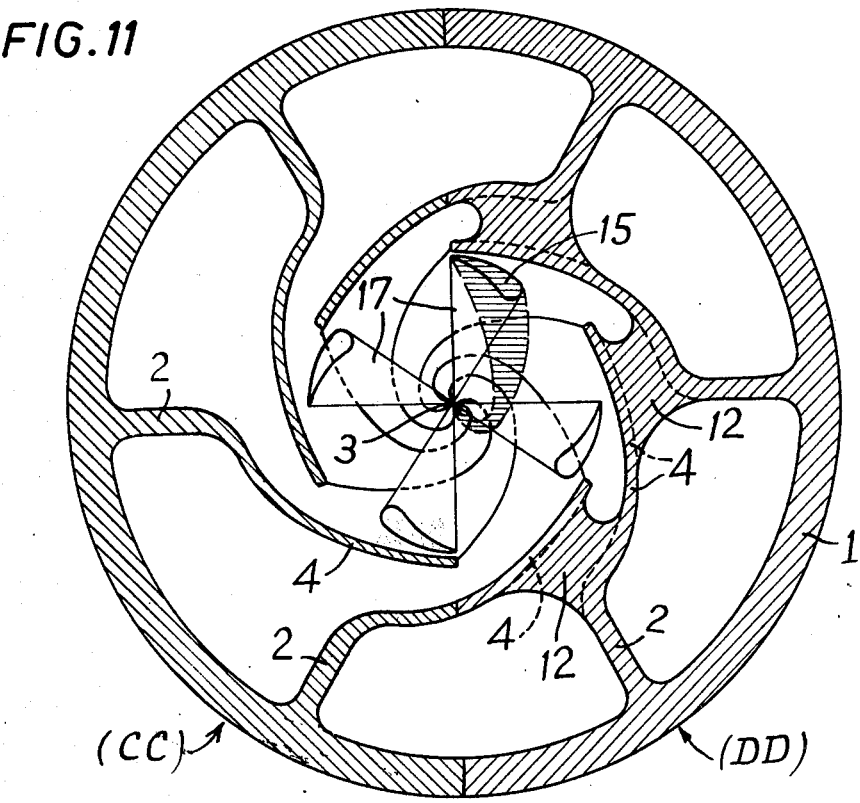
FIG. 11 shows, in two transverse sections, C—C and D—D, respectively, a variant pump impeller according to the invention.

Finally, although, in the most usual embodiments, the hub is internal and the blades external, it is also possible, in a variant, for the hub 1 to be hollow, to make supports 2 fast therewith and render the supports fast with the blades 4. Such a variant is shown in FIG. 11 and may of course be provided with an anti-whirl device 15 or 17.

The functioning and advantages of the pump impeller described hereinabove will now be set forth.

Almost all the surface of the blades 4 is perpendicular to radii passing through the axis of the rotation 3. Consequently they offer a good yield, which is further improved by the thinning of the blades above the channels ($E_9$ smaller than $E_2$), and by the complementary shape given by the tails 13 of the blades 4 to the constitution of each channel 9.

The helical form of the channels 9 contributes to the good flow of the fluid in view of the length of the corresponding leading edges, in the same way as the ogival form of the surface 11 is such as to produce a satisfactory progressivity of the fluid flows. However, it should be noted that the preferred ogival form is not exclusive, and that cylindrical or spherical surfaces 11 are also in accordance with the invention.

The tongues 12 make it possible to obtain a good resistance of the blades to centrifugal forces, give the pump impeller a good resistance to wear and tear and correctly guide the fluid.

Finally, the anti-whirl devices 15 advantageously complete the effects of the other arrangements concerning the flow of the fluids.

What is claimed is:

1. A pump impeller comprising a hub, at least one blade, a support, associated with each blade, extending radially from said hub and fixing each blade to said hub, each support winding helically with respect to the axis of said hub, and each blade extending in a direction substantially perpendicular to the radial direction of the associated support; the improvement comprising a portion of each blade overlapping another blade portion in spaced relation thereto, and a tongue extending between and interconnecting the overlapping blade portions.

2. A pump impeller according to claim 1 wherein at least two separate blades are provided, one partially overlapping the other and defining the overlapping blade portions, said tongue connecting the separate blades in the area of the overlapping portions.

3. A pump impeller according to claim 1 comprising a single blade which overlaps and is superposed on itself to define the overlapping blade portions, said tongue connecting the overlapped portions of the single blade.

* * * * *